(12) United States Patent
Jack et al.

(10) Patent No.: US 6,300,702 B1
(45) Date of Patent: Oct. 9, 2001

(54) ELECTRICAL MACHINE ELEMENT

(75) Inventors: Alan G. Jack, Northumberland; Barrie Mecrow, Tyne and Wear, both of (GB)

(73) Assignee: Höganäs AB, Hoganas (SE)

( * ) Notice: Subject to any disclaimer, the term of this patent is extended or adjusted under 35 U.S.C. 154(b) by 0 days.

(21) Appl. No.: 09/664,591

(22) Filed: Sep. 18, 2000

Related U.S. Application Data

(63) Continuation of application No. PCT/SE99/00499, filed on Mar. 29, 1999.

(30) Foreign Application Priority Data

Mar. 30, 1998 (SE) ................................................ 9801123

(51) Int. Cl.$^7$ .......................................................... H02K 1/00
(52) U.S. Cl. .............................................. 310/216; 310/254
(58) Field of Search ................................. 310/12, 193, 216, 310/217, 218, 254, 258, 259; 29/596–598

(56) References Cited

U.S. PATENT DOCUMENTS

| | | | |
|---|---|---|---|
| 4,392,072 | * 7/1983 | Rosenberry | 310/216 |
| 4,698,539 | * 10/1987 | Workman | 310/216 |
| 4,947,065 | 8/1990 | Ward et al. . | |
| 5,532,531 | 7/1996 | Sakamoto . | |
| 6,034,461 | * 3/2000 | Sun | 310/218 |
| 6,087,755 | * 7/2000 | Suzuki et al. | 310/254 |
| 6,104,117 | * 8/2000 | Nakamura et al. | 310/254 |

FOREIGN PATENT DOCUMENTS

| | | |
|---|---|---|
| 0088992 | 9/1983 | (EP) . |
| 60152245 | 12/1985 | (JP) . |
| 8111968 | 4/1996 | (JP) . |
| WO95/12912 | 5/1995 | (WO) . |

* cited by examiner

*Primary Examiner*—Tran Nguyen
(74) *Attorney, Agent, or Firm*—Burns, Doane, Swecker & Mathis, LLP

(57) ABSTRACT

A stator assembly for an electrical machine comprises a core made of a magnetic material. The core has an annular yoke (2) and a plurality of teeth (3) spaced circumferentially on the annular yoke and extending radially therefrom. The spaces between the teeth define circumferentially spaced winding slots (6). A stator winding is carried by the stator core and has coil turns located around the teeth and in the winding slots. Each tooth and a radially adjoining part (4) of the yoke have varying axial dimensions in order to adjust the magnetic flux to an optimal flux density in each part of the magnetic flux path in the stator. The annular yoke (2) may extend axially past the teeth (3) at least at one of the axial sides thereof.

21 Claims, 2 Drawing Sheets

ELECTRICAL MACHINE ELEMENT

This application is a Continuation of International Application No. PCT/SE99/00499, filed Mar.29, 1999 that designates the United States of America and claims priority for the filing of Swedish Application No. 9801123-2, filed Mar. 30, 1999.

TECHNICAL FIELD

The present invention generally is related to electrical machines, especially motors, and more precisely is directed to the structure of the stator or rotor assembly thereof.

BACKGROUND OF THE INVENTION AND PRIOR ART

Electrical machines have a stationary element and a movable element. The movable element may be a rotating element or a linearly movable element. The interaction between the stationary element and the movable element is based on the interaction of a magnetic field generated by either the stationary element or the movable element and electric currents in a winding on the movable element or the stationary element, respectively. The interaction is such that the direction of the current, the direction of the magnetic field and the direction of the movement are at substantially right angles to each other, e.g. along an x-direction, a y-direction and a z-direction of a right-angled co-ordinate system.

The winding comprises a plurality of coils wound around teeth of a soft magnetic material normally consisting of steel laminations in order to reduce the eddy currents.

Although the winding can be wound on the stationary element or on the movable element, the following description will be limited to the winding being part of a stator assembly.

Conventionally, the stator assembly of an electrical machine has a stator core formed of a stack of steel laminations. As an alternative to the use of steel laminations, the stator core may be formed from iron powder, as exemplified by U.S. Pat. No. 4,947,065 disclosing a stator moulded in one-piece, and by International Patent Application WO95/12912 disclosing a stator comprising a plurality of separate and substantially identical parts.

By its very nature any compacted, non-sintered material will not be fully dense. This means that soft iron powder currently available will have permeabilities that are lower than the permeabilities obtainable with steel laminations. However, magnetic powder composites could offer advantages such as isotropic magnetic behavior, reduction in iron losses at high frequencies, improved thermal characteristics and flexible design and assembly.

SUMMARY

An object of the present invention is to provide an electrical machine element, specifically a stator assembly, which reduces the cost of the machine without loss of performance. An electrical machine element in accordance with the present invention is characterized by the features specified in appended claim 1. Preferred embodiments of that electrical machine element are defined in the dependent claims.

Thus, the present invention is related to a combination of a core made of a magnetic powder material and having a yoke and a plurality of teeth spaced in a first direction along the yoke and extending therefrom in a second direction. Here, the spaces between the teeth define spaced winding slots. Further, a winding carried by the core has coil turns located around the teeth and in the winding slots.

According to the invention, the combination assembly is characterized in that each tooth and an adjoining part of the yoke have varying dimensions in a direction transverse to the plane defined by said first and second directions in order to adjust the magnetic flux to a desired or optimal flux density in each part of the magnetic flux path in the core.

In a first embodiment, the core and the winding constitute a stator assembly for a rotational electrical machine. Therefore, the core has an annular yoke and a plurality of teeth spaced circumferentially on the annular yoke, and the spaces between the teeth define circumferentially spaced winding slots.

In a preferred embodiment, the teeth extend radially from the yoke, and each tooth and the adjoining part of the yoke have varying axial dimensions.

Alternatively, the teeth may extend axially from the yoke in which case each tooth and the adjoining part of the yoke will have varying radial dimensions.

The teeth of the core may have a rounded profile such that sharp bending of the coil turns is eliminated and the risk of penetration of the insulation at the corners is reduced. This allows thinner insulation to be used resulting in a substantial thermal benefit.

In a preferred embodiment of the above stator assembly, each tooth forms a separate unit or segment with an adjoining part of the yoke.

As a result of the design according to the present invention, the magnetic field from the coil turn parts is actively used. Thereby, stray losses are reduced and a more efficient machine is provided. Also, a better heat transfer is obtained; specifically by means of the axial extensions of the yoke adjoining the coil turn parts outside the winding slots.

In a further embodiment, the core and the winding constitute a stator assembly for a linear electrical machine, the core having a longitudinal yoke and a plurality of teeth spaced along the longitudinal yoke, and the spaces between the teeth defining longitudinally spaced winding slots. This corresponds to the direction of the movement being along an x-direction, the direction of the magnetic field being along a y-direction and the direction of the varying dimensions of each tooth and an adjoining part of the yoke being along a z-direction of a right-angled co-ordinate system. The improved efficiency may be used for increasing the slot area and/or reducing the width of the yoke. This means a possibility of either reducing the dimensions of the electrical machine with maintained performance or improving the performance with maintained dimensions.

DESCRIPTION OF THE PREFERRED EMBODIMENTS

Figure 1:
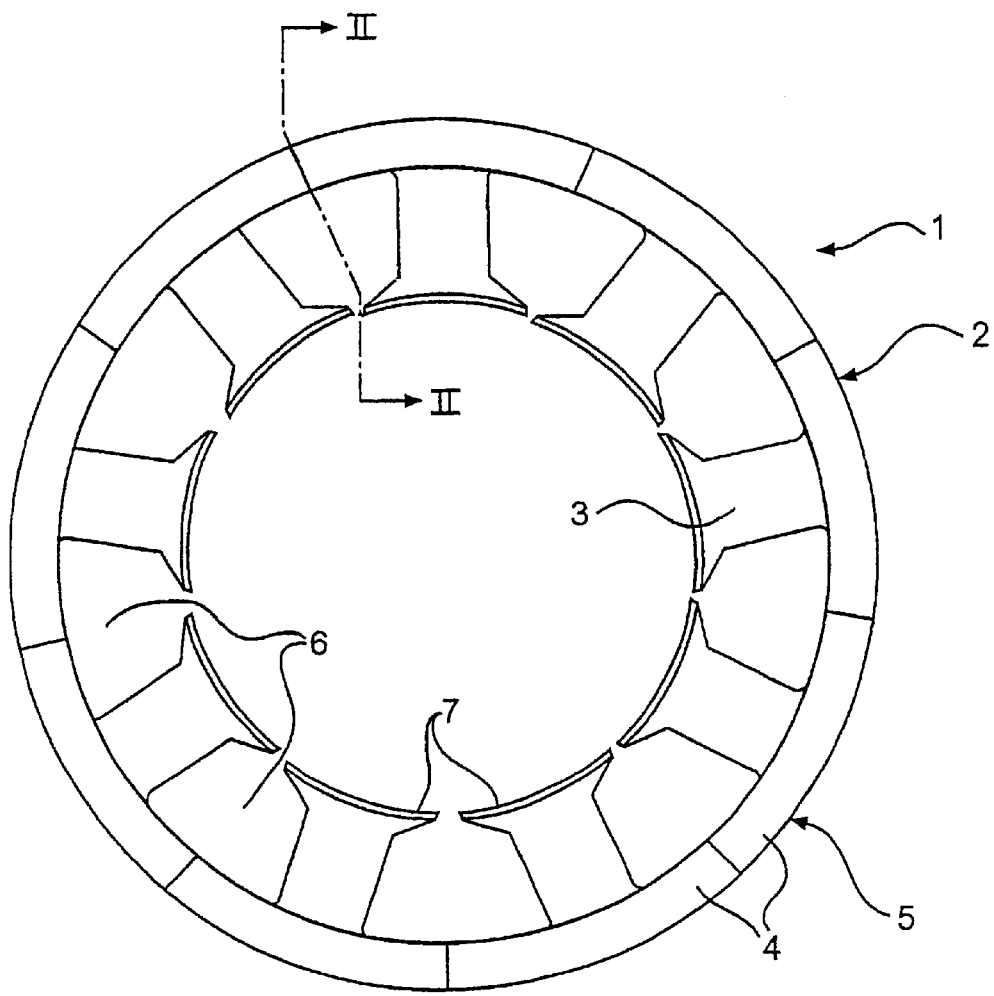
FIG. 1 is an axial view of a stator of a servo motor according to a first embodiment of the invention.
Figure 2:
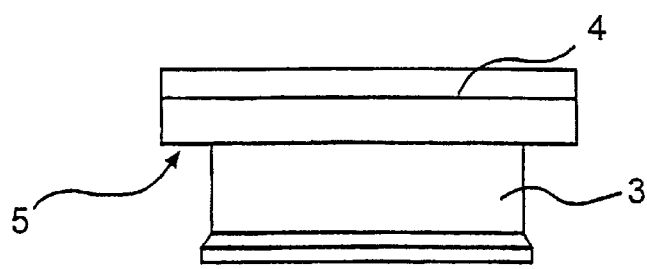
FIG. 2 is an axial sectional view along lines II—II in FIG. 1 and shows the axial profile of the yoke and a tooth of the core of the stator according to the first embodiment of the invention.

Referring to FIGS. 1 and 2, a stator 1 of a servo motor is illustrated as having a core consisting of a yoke 2 and nine poles or teeth 3. Each tooth 3 and an adjoining part 4 of the yoke 2 forms a separate unit or segment 5. Each adjoining part 4 projects in the circumferential direction from both sides of its tooth 3 such that a slot 6 is formed on each side of each tooth 3. Further, the inner tip 7 of each tooth 3 is widened in the circumferential directions while the rest of each tooth 3 has a substantially constant width.

Assembling the stator 1 from the separate units 5 permits an easy winding of each unit 5 of the stator.

The nine separate units 5 are made of a soft magnetic powder composite material which is filled into a die, pressed to a desired shape and then heat treated at a relatively low temperature so as not to destroy the necessary insulating layer between the powder particles. This means that volume production of the separate units 5 is possible and results in no material waste and a finished pressed unit with high tolerances and little or no machining being required.

As shown for one unit 5 in FIG. 2, the axial length of each tooth 3 is less than the axial length of the adjoining part 4. This extension of the yoke 2 axially past the teeth 3 on both axial sides thereof increases the active length of the windings and reduces the stray losses such that a more efficient machine is provided. Further, the heat transfer from the windings to the stator is improved by the axial extensions of the yoke adjoining the coil turn parts outside the winding slots.

The above described design may be used for reducing the total winding length and thereby reduce the dimensions of the electrical machine with maintained performance.

A further advantage of using powder material is that the sectional tooth profile may be rounded or oval such that sharp bending of the coil turns is eliminated and the risk of penetration of the insulation at the corners is reduced. This allows thinner insulation to be used resulting in a substantial thermal benefit. The winding arrangement may comprise a non-overlapping winding on each tooth, which simplifies the winding operation and allows very high packing factors to be achieved.

It should be noted that the rotor (not shown in FIGS. 1 and 2) of the servomotor preferably is of conventional laminated design, with surface magnets preferably with magnet skew to reduce clogging.

Figure 3:
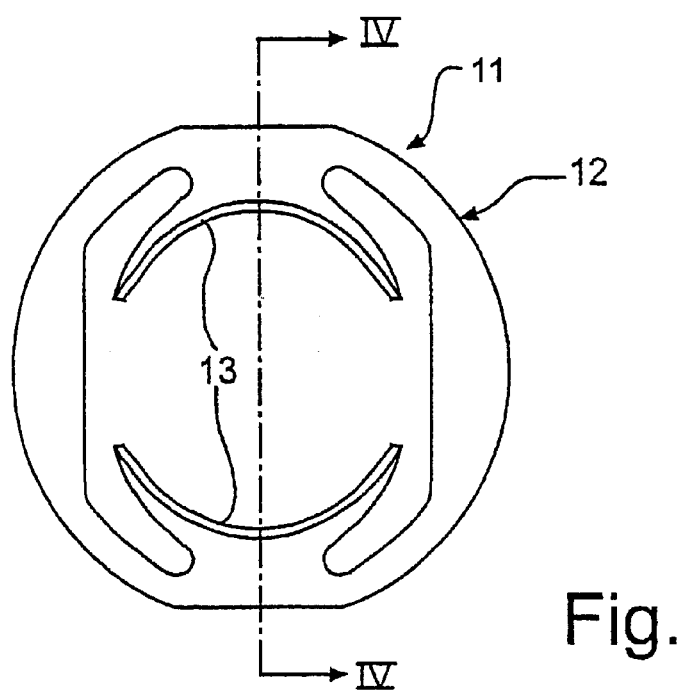
FIG. 3 is an axial view of a stator of a universal motor according to a second embodiment of the invention.
Figure 4:
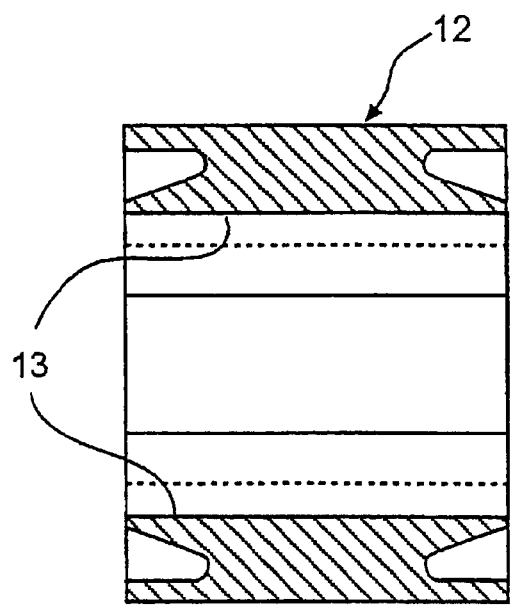
FIG. 4 is an axial sectional view along lines IV—IV in FIG. 2 and shows the axial profile of a pole of the stator according to the second embodiment of the invention.

Referring now to FIGS. 3 and 4, a stator 11 of a universal motor according to a second embodiment of the invention is illustrated as having a core consisting of a yoke 12 and two poles or teeth 13. The rotor is conventional and is not illustrated. The core is formed from iron powder and is moulded in one piece.

The shape of the core as seen in FIG. 3 is conventional, while the axial sectional shape (shown in FIG. 4) of each one of its poles 13 resembles the axial sectional shape of the teeth 3 of the servo motor stator exemplified in FIG. 2 in that the axial length of the yoke 12 is greater than the axial length of the adjoining part of the poles 13. However, the inner tips 14 of the poles 13 of the universal motor stator 11 are extended axially and of substantially the same length as the yoke 12. Thereby, a low air gap flux density is concentrated into a shorter armature winding and the iron volume of the stator is reduced.

While only two embodiments of the present invention are described above, it is obvious to those skilled in the art that the several modifications are possible without departing from the spirit of the present invention.

Thus, the invention may be applied to other types of motors, e.g. induction motors, reluctance motors, stepping motors and hybrid stepping motors, and to corresponding types of generators, i.e. generally to rotating electrical machines. Also, the invention can be used in machines having an outer rotor instead of the exemplified inner rotor.

Further, the material of the stator may comprise a powder material combined with other materials, e.g. laminations, or the stator may be made by casting.

It should be noted that the teeth even might be longer axially than the teeth tips (and/or the yoke), e.g. for lowering the flux density in the teeth and thereby reducing the risk of magnetic saturation therein.

Generally, the invention aims at using a material or a combination of materials that makes it possible to vary the dimensions of each tooth and the adjoining part of the yoke substantially in a direction transverse to the plane of the laminations in a conventional electrical machine in order to adjust the magnetic flux to an optimal flux density in each part of the magnetic flux path. In other words, each tooth and the adjoining part of the yoke have varying dimensions in said transverse direction, i.e. differing from a constant width.

Finally, it should be emphasized that the invention is not limited to the specific, above-described embodiments but is as well applicable to electrical machines having other combinations of stationary and movable elements.

What is claimed is:

1. In an electrical machine, the combination comprising a core made of magnetic powder material and having a yoke (2; 12) and a plurality of teeth (3; 13) spaced in a first direction along the yoke and extending therefrom in a second direction substantially transverse to said first direction, the spaces between the teeth defining spaced winding slots (6), and a winding carried by the core and having coil turns around the teeth and in the winding slots, characterized in that each tooth (3; 13) and an adjoining part (4) of the yoke (2; 12) have varying dimensions in a direction transverse to the plane defined by said first and second directions in order to adjust the magnetic flux density in each part of the magnetic flux path in the core and the yoke.

2. The combination as claimed in claim 1, wherein the core and the winding constitute a stator assembly for a rotational electrical machine, the core having an annular yoke (2; 12) and a plurality of teeth (3; 13) spaced circumferentially on the annular yoke, and the spaces between the teeth defining circumferentially spaced winding slots (6).

3. The combination as claimed in claim 2, wherein the teeth (3; 13) extend radially from the yoke (2; 12), and each tooth and the adjoining part of the yoke have varying axial dimensions.

4. A stator assembly for an electrical machine as claimed in claim 3, wherein the annular yoke (2; 12) extends axially past the teeth (3; 13) at least at one of the axial sides thereof.

5. A stator assembly for an electrical machine as claimed in claim 4, wherein the teeth (13) have tips (14) extending axially past the main part of the teeth.

6. A stator assembly for an electrical machine as claimed in claim 4, wherein the teeth (3; 13) of the core have a rounded profile eliminating sharp bending of the coil turns and reducing the risk of penetration of the insulation at the corners.

7. A stator assembly for an electrical machine as claimed in claim 4, wherein each tooth (3) forms a separate segment (5) with the adjoining part (4) of the yoke (2).

8. A stator assembly for an electrical machine as claimed in claim 3, wherein the teeth (13) have tips (14) extending axially past the main part of the teeth.

9. A stator assembly for an electrical machine as claimed in claim 8, wherein the teeth (3; 13) of the core have a rounded profile eliminating sharp bending of the coil turns and reducing the risk of penetration of the insulation at the corners.

10. A stator assembly for an electrical machine as claimed in claim 8, wherein each tooth (3) forms a separate segment (5) with the adjoining part (4) of the yoke (2).

11. A stator assembly for an electrical machine as claimed in claim 3, wherein the teeth (3; 13) of the core have a rounded profile eliminating sharp bending of the coil turns and reducing the risk of penetration of the insulation at the corners.

12. A stator assembly for an electrical machine as claimed in claim 3, wherein each tooth (3) forms a separate segment (5) with the adjoining part (4) of the yoke (2).

13. The combination as claimed in claim 2, wherein the teeth extend axially from the yoke, and each tooth and the adjoining part of the yoke have varying radial dimensions.

14. A stator assembly for an electrical machine as claimed in claim 13, wherein the annular yoke extends radially past the teeth at least at one of the radial sides thereof.

15. A stator assembly for an electrical machine as claimed in claim 14, wherein the teeth have tips extending radially past the main part of the teeth.

16. A stator assembly for an electrical machine as claimed in claim 13, wherein the teeth have tips extending radially past the main part of the teeth.

17. A stator assembly for an electrical machine as claimed in claim 2, wherein the teeth (3; 13) of the core have a rounded profile eliminating sharp bending of the coil turns and reducing the risk of penetration of the insulation at the corners.

18. A stator assembly for an electrical machine as claimed in claim 2, wherein each tooth (3) forms a separate segment (5) with the adjoining part (4) of the yoke (2).

19. A stator assembly for an electrical machine as claimed in claim 1, wherein the core and the winding constitute a stator assembly for a linear electrical machine, the core having a longitudinal yoke and a plurality of teeth spaced along the longitudinal yoke, and the spaces between the teeth defining longitudinally spaced winding slots.

20. A stator assembly for an electrical machine as claimed in claim 1, wherein the teeth (3; 13) of the core have a rounded profile eliminating sharp bending of the coil turns and reducing the risk of penetration of the insulation at the corners.

21. A stator assembly for an electrical machine as claimed in claim 1, wherein each tooth (3) forms a separate segment (5) with the adjoining part (4) of the yoke (2).

\* \* \* \* \*